United States Patent [19]
Yamashita

[11] Patent Number: 5,963,702
[45] Date of Patent: *Oct. 5, 1999

[54] DEVICE AND METHOD FOR RECORDING BROADCAST SIGNAL

[75] Inventor: Keitaro Yamashita, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,350

[22] Filed: Nov. 26, 1996

[30] Foreign Application Priority Data

Dec. 13, 1995 [JP] Japan .................................. 7-346270

[51] Int. Cl.⁶ ..................................................... H04N 5/76
[52] U.S. Cl. .................. 386/46; 386/83; 386/95
[58] Field of Search .................. 386/46, 95, 96, 386/97, 106, 109, 111, 121, 92, 125, 83; H04N 5/76

[56] References Cited

U.S. PATENT DOCUMENTS

| | | | |
|---|---|---|---|
| 5,187,589 | 2/1993 | Kono et al. | 386/83 |
| 5,546,191 | 8/1996 | Hibi et al. | 386/83 |
| 5,576,950 | 11/1996 | Tonomura et al. | 386/121 |

*Primary Examiner*—Huy Nguyen
*Attorney, Agent, or Firm*—Frommer Lawrence & Haug, LLP.; William S. Frommer

[57] ABSTRACT

A device capable of performing digest recording for a broadcast signal including a multiple of channels. The broadcast signal is received by an antenna and passed to one or more channel tuners. The tuner outputs, or "broadcast programs" are monitored and portions of each program are selected for recording in response to information detected in the program—for example, in response to scene changes. The portions selected for recording are encoded and multiplexed for recording on a recording medium along with selection information.

4 Claims, 11 Drawing Sheets

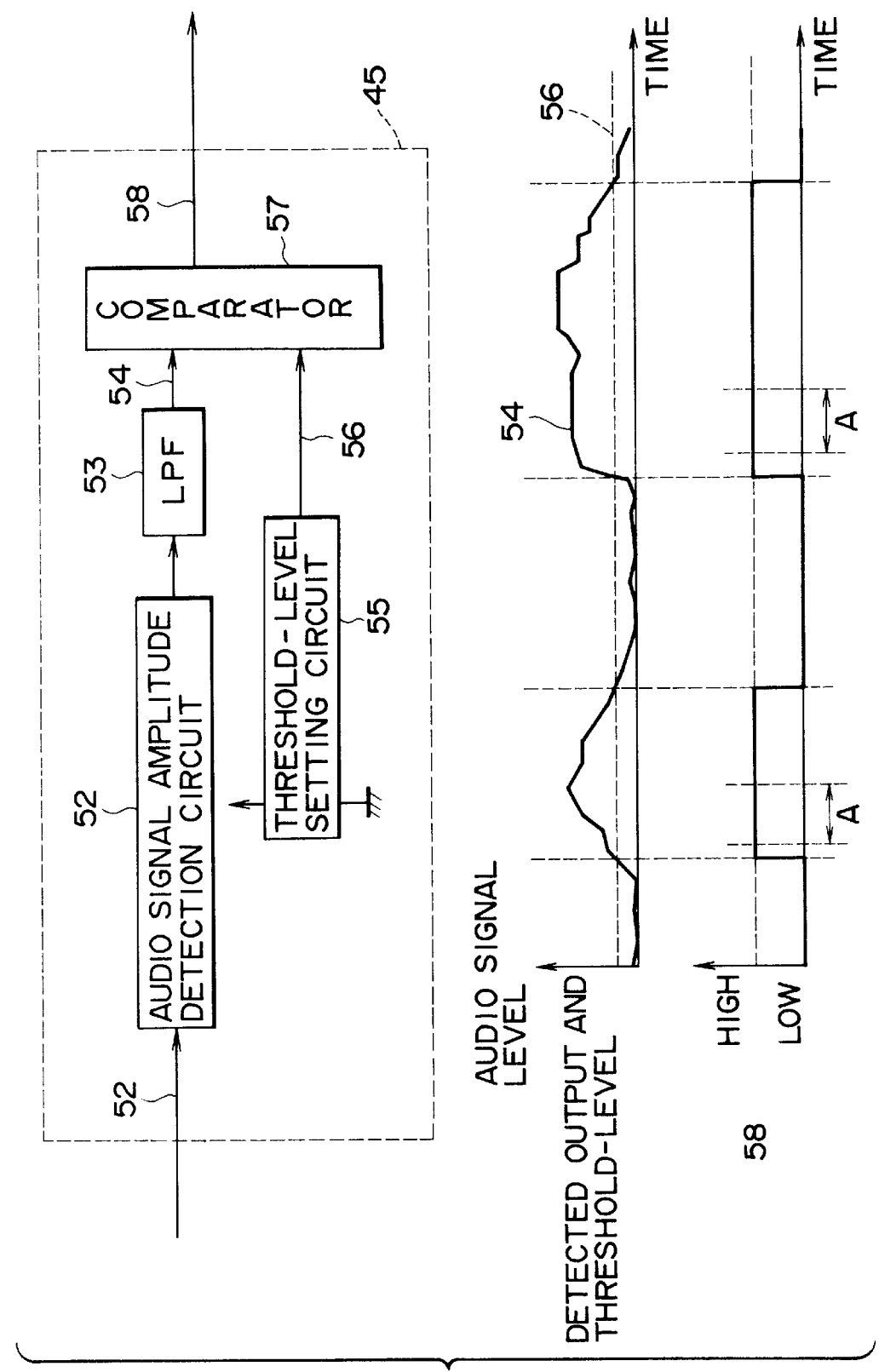

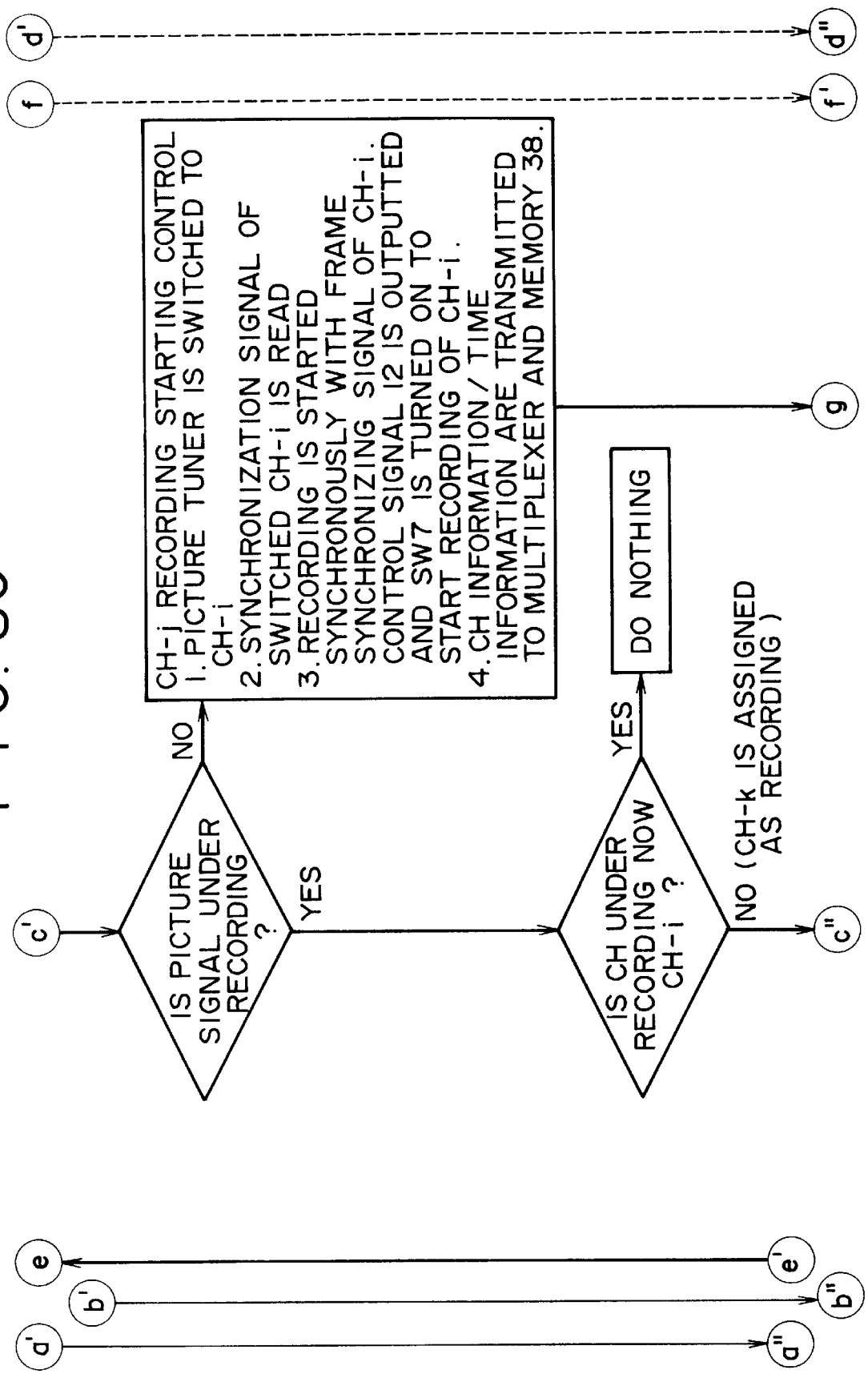

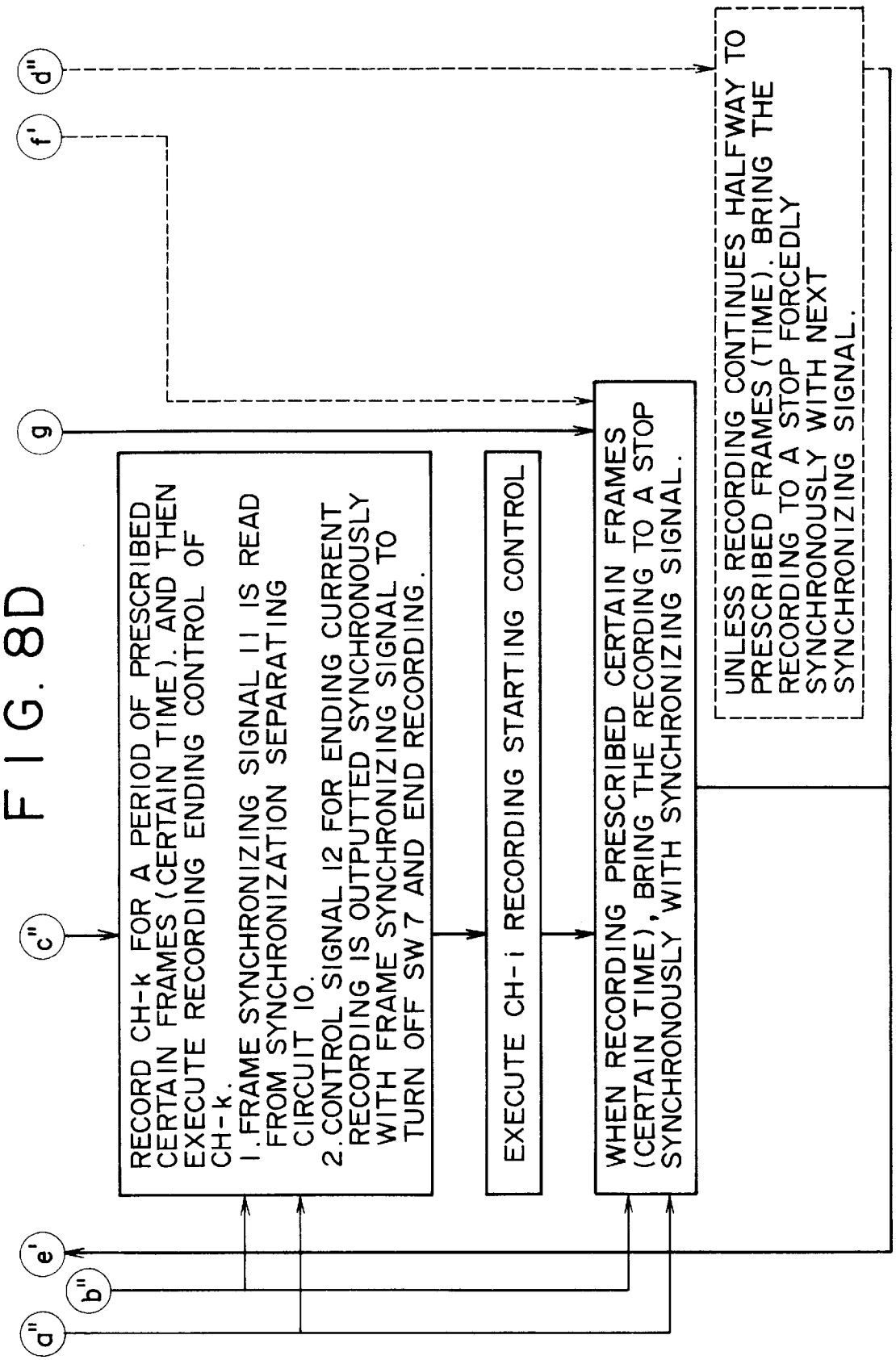

DEVICE AND METHOD FOR RECORDING BROADCAST SIGNAL

BACKGROUND OF THE INVENTION

1. Field of the Invention

This invention relates to a device and method for recording of digest of broadcasting signal (including picture information transmitted through cable television) for selecting and viewing a desired program effectively by having an overview of programs on a list containing many programs, and for example, relates to a device and method capable of efficient recognition of broadcast information in such case that a user wants to grasp the content of news for a day or specific programs.

This invention relates to a device for recording of broadcasting signal which samples representative pictures, records them on a recording medium such as hard disk, optical disk, and semiconductor memory, and which records and plays back easily such information with a reduced record and high accessibility.

2. Description of the Related Art

Conventionally, VTR (magnetic recording tape device) has been generally known as a recorder for recording broadcasting signal. Magneto-optic disk/recorder for optical disk has been used practically for institutional use.

Generally, desired broadcast programs are recorded and played back using these recording devices.

Generally, the broadcast program (television broadcast) includes news program that is the information program itself and also includes many programs other than new program which involve amusement and also information.

On the other hand recently, the mass-media era has brought about increasing of the number of channels and 24 hours broadcasting, however, the time assigned for viewing TV is limited.

Often a user can not know the content of broadcast programs including news.

Therefor, when a user wants to obtain information from a plurality of broadcast programs, a means for grasping quickly the content of many programs and select desired programs, and means for viewing effectively the selected programs are required.

A conventional VTR is capable of recording of much information and realizes the high speed playback technology such as high speed searching, however, such conventional VTR is not suitable for the use which requires "accessibility", for example, the accessibility to programs when a user wants to view highlights of a plurality of programs, because it takes so long time to traverse/rewind quickly.

An access in the recorded order (or inverse recorded order) is operated somewhat easily, but an access to programs which were recorded randomly is not practical, and even if a program is to be specified, it takes so long time to have an access to the tape position of the program. Such poor accessibility of the conventional VTR is a problem, and the conventional VTR can not realize such "accessibility".

On the other hand, various disk devices are excellent in accessibility. However, the picture signal involves much information even though picture signal is compressed, large number of disks/drives are required for sufficient capacity for recording a plurality of programs, such requirement will results in a large-sized and expensive device, therefore such device is not practical.

SUMMARY OF THE INVENTION

The present invention is accomplished to mitigate such problems, basically the device of the present invention for recording broadcast signal is provided with a means for detecting the scene change information from the picture signal itself and the representative picture to be recorded is formed based on the scene change information.

By using the technique of the present invention, a system that a plurality of programs is recorded on a device having a small capacity, programs are searched, a desired program is selected, and the desired program is viewed is realized.

By processing as described herein above, the quantity of recording information of one program is reduced, and the access time is shortened even if the programs are recorded on a recording tape.

In the case that programs are recorded on various disk devices, the reduced quantity of information results in the reduced required capacity, it is possible to realize inexpensive devices with excellent accessibility.

In the practical structure of the device, for example, the device capable of recording a plurality of channels simultaneously having only one expensive picture signal encoder is structured, such device is manufactured at a low cost.

The reduction of information per program is significantly effective on the so called hierarchical storage which is the combination of a buffer memory using a disk or semiconductor memory and an inexpensive tape device.

In detail, by reducing the quantity of recording information per unit time or channel, when a storage having the same capacity and circuit of the same band are used, the device is capable of recording multi-CHs, and under the condition of fixed recording time and the number of CHs, a small storage capacity is sufficient for use and a circuit of narrow band can be used, such advantages lead to cost saving of the device.

Further, the switching of picture signal based on the audio signal allows the use of reduced number of the picture signal processing circuit, which is expensive and requires generally wide band, and such switching is very effective on the cost saving of the system.

BRIEF DESCRIPTION OF THE DRAWINGS

FIG. 7 is a diagram for illustrating the selection of a representative picture based on the audio signal.

FIG. 8 comprising FIGS. 8A–8D is a flow chart for selecting the recording channel based on the audio signal in the multi-channel recording device.

DETAILED DESCRIPTION OF PREFERRED EMBODIMENTS

Figure 1:
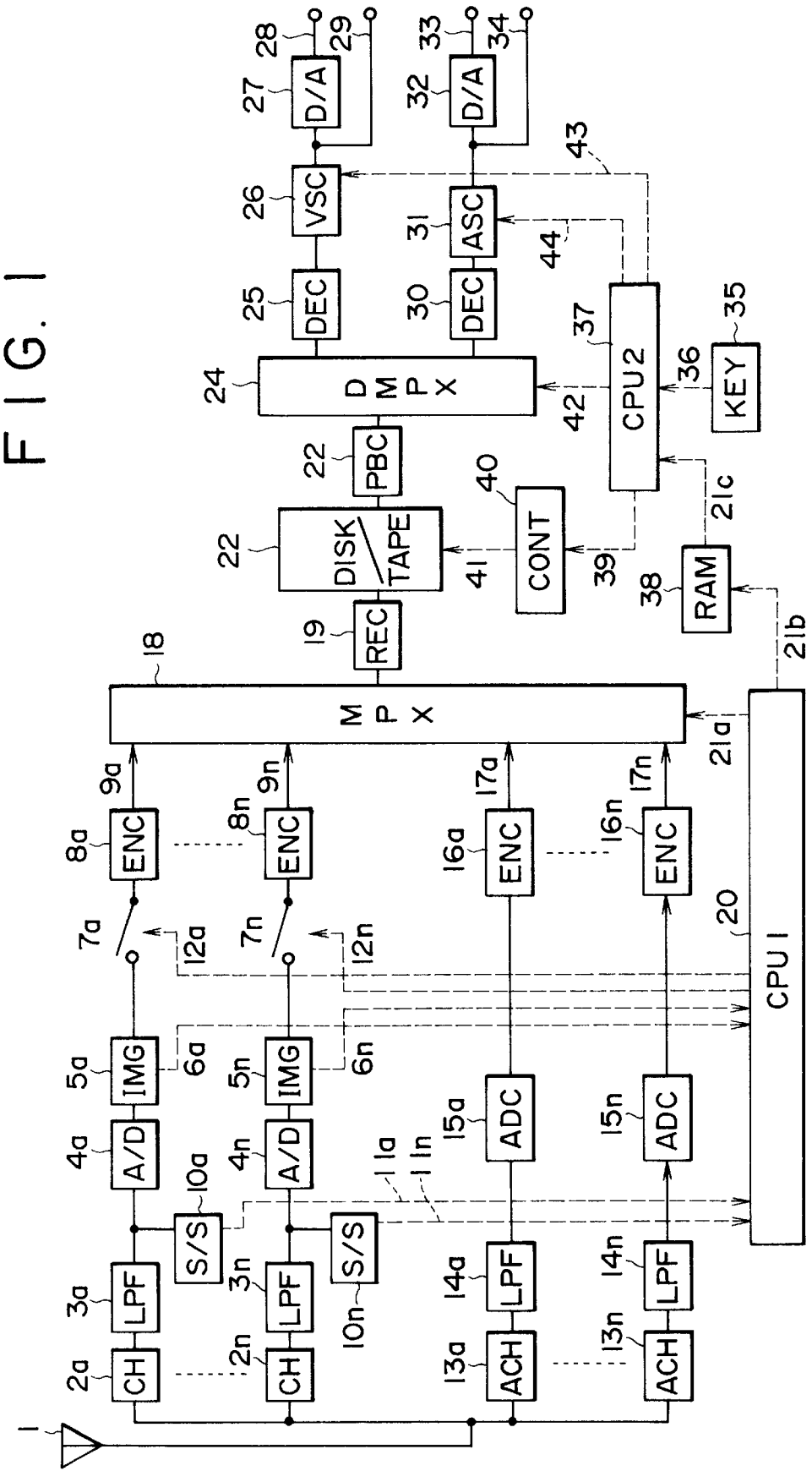
FIG. 1 is a block diagram for illustrating an embodiment of a recording device of the broadcast signal of the present invention.

FIG. 1 is a typical block diagram of the present invention.

In this figure, the case that a plurality of channels (referred to as CH) are recorded simultaneously, but in the case that a single CH is recorded or played back, channels with symbols of b to n shown in the figure may be omitted.

First the recording system is described hereinafter.

A broadcast signal received by an antenna 1 is inputted to picture signal tuners 2a to 2n and audio signal tuners 13a to 13n. A picture signal tuner and an audio signal tuner may be contained in a single tuner circuit.

Hereinafter, a recording system of the picture signal is described for a signal system of the tuner 2, however, recording systems of the picture signal for other channels (b to n) are the same, therefore description and block diagrams for these systems are omitted.

The picture signal passes through LPFs (low pass filter) 3a to 3n, then picture signal is sampled, and digitized by AD converters 4a to 4n.

For each channel, the picture signal is synchronization-separated by a synchronization separation circuit 10a (b to n).

The position of synchronization separation in this embodiment shows only one position example, the signal may be subjected to the synchronization separation after digitized. Synchronized signals 11a to 11n obtained from synchronization separation circuits are fed to the first microcomputer 20 to generate SW control signals 12a to 12n which will be described hereinafter.

Signals digitized by AD converters 4a to 4n are inputted to representative picture detecting circuits 5a to 5n, which will be described hereinafter, to detect information for representative picture detection. The scene change detection technology using the movement detection technology may be used as the method for information detection. (Example of such method for information detection will be described referring to FIG. 3 and following figures for the case that the movement detection technology is used) Information 6a to 6n obtained from the detection circuits 5a to 5n are fed to the first microcomputer 20 as the information to generate SW control signals 12a to 12n like the synchronization signals.

The first microcomputer 20 judges whether each field (or frame) of each CH is to be recorded or thinned as a unit based on the synchronization signal 11a to 11n, the scene change information 6a to 6n obtained from the representative picture detection circuits, and timer contained in the microcomputer, outputs SW control signals 12a to 12n, and controls switches 7a to 7n for on-off switching of input signal fed to encoders 8a to 8n. When the switches are turned on, picture signals are fed to picture encoders 8a to 8n and encoded, and then outputted as picture signals 9a to 9n.

Type of encoding is not specified, however, when one independent one field or one frame is selected and controlled so as to be played back in slide show mode of a static picture, processing of in-plane completion is required. When the switches 7a to 7n are off, signals are not inputted to the encoders, therefore encoded signals are not outputted.

In such controlling, the operation is controlled so that independent one field or one frame is selected as a representative picture and played back in slide show mode of a static picture, however otherwise, the operation is controlled so that independent continuous signals of several fields or signals for several minutes are selected, and played back with switching of short dynamic pictures. It is possible to record only a representative picture, however, it is also possible to record with addition of pictures other than the representative picture within a limitation of recordable information to display the smooth picture when played back.

For the selection of pictures to be added, a method in which pictures are selected every certain time intervals is the simplest, but it is desirable to control so that, when successive pictures involving dynamic scene continue, not many pictures are thinned and many pictures are recorded, on the other hand, when successive pictures involving not dynamic scene continue, namely almost static scene, many pictures are thinned and not many pictures are recorded using the scene change information 6a to 6n obtained from the representative picture detection circuit By operating this processing, picture signal information with a volume which occupies the major portion of recording signal is reduced significantly in volume without loosing characteristics capable of grasping the content of the picture.

Next, the audio signal processing of the recording system is described. An audio signal is detected by audio tuners 13a to 13n, passes through LPFs 14a to 14n, digitized by AD converters 15a to 15n, and then encoded by encoders 16a to 16n to generate encoded audio signals 17a to 17n.

The encoded picture signals 9a to 9n and audio signals 17a to 17n are inputted to a multiplexer 18 and multiplexed. When, scene change information 21A (time/CH/Sw on-off information) for selection of a representative picture of picture CH is transmitted from the first microcomputer 20 to the multiplexer 18 and recorded as additional information for recording and playing back.

Simultaneously, information 21b (time/CH, Sw on-off information) for selection of representative picture of the picture CH is transmitted to a memory 38 and stored in arrangement with correspondence to the address on a storage medium 22.

Thereby, program selection (time/CH) for playing back and picture and audio synchronization playing back are made possible.

The multiplexed signal is subjected to the channel coding processing (ECC) by a recording circuit for storage 19 for processing to record the information in the storage, then the signal is recorded in the storage device 22 comprising disks and tapes.

Next, a playback system is described.

A user operation input circuit 35 receives an operation desired by a user, the information 36 is transmitted to the second microcomputer 37. The second microcomputer 37 receives the address in the recording medium and information for recording picture and audio 21c from the memory 37 and outputs the access control signal 39 to a control/driving circuit 40 to obtain the information.

The control/driving circuit 40 which received access control signal 39 reads out information required by a user from the storage medium 22 in response to the storage control signal 41. The read signal is released from the channel decoding and ECC by a playback circuit 23 for storage and inputted to a demultiplexer 24.

The second microcomputer 37 transmits a demultiplexer control signal 42 to also the demultiplexer 24 for enabling to realize the AV synchronization for playing back and playing back of thinned picture signal in correct timing.

A picture signal decoder 25 decodes the picture signal outputted from demultiplexer 24, then the picture signal passes through a picture signal processing circuit 26 and DA converter 27, and outputted in the form of analog output 28. Of course, it is possible to output the signal in the form of digital signal 29 without passing through the DA converter 27 depending on the specification of a receiving set which receives the signal.

The picture signal processing circuit 26 executes graphic processing such as on-screen display function in response to a control signal 43 from the second microcomputer 37.

On the other hand, the audio signal outputted from demultiplexer 24 passes through an audio signal decoder 30, a audio signal processing circuit 31, and DA converter 32, and the signal is outputted in the form of analog audio signal 33.

The signal may be outputted in the form of digital output 34 depending on the relation to the connected receiving set like the picture signal.

Usually, a user plays back only one program at a time, therefore the system for playing back has basically one CH for both picture signal and audio signal. However some TV receivers are capable of playing back a plurality of CHs. In the case that a broadcasting signal recording device is made compatible with such TV receivers, the broadcasting signal recording device is provided with a structure in which one set of the same circuits as those 25 to 27 for the picture signal system are provided additionally.

In this figure, two microcomputers are used for the convenience of description, but it is possible to process using a single microcomputer by combining the first microcomputer 20 and second microcomputer 37, and otherwise a microcomputer is divided to several microcomputers using a plurality of chips.

Figure 2:
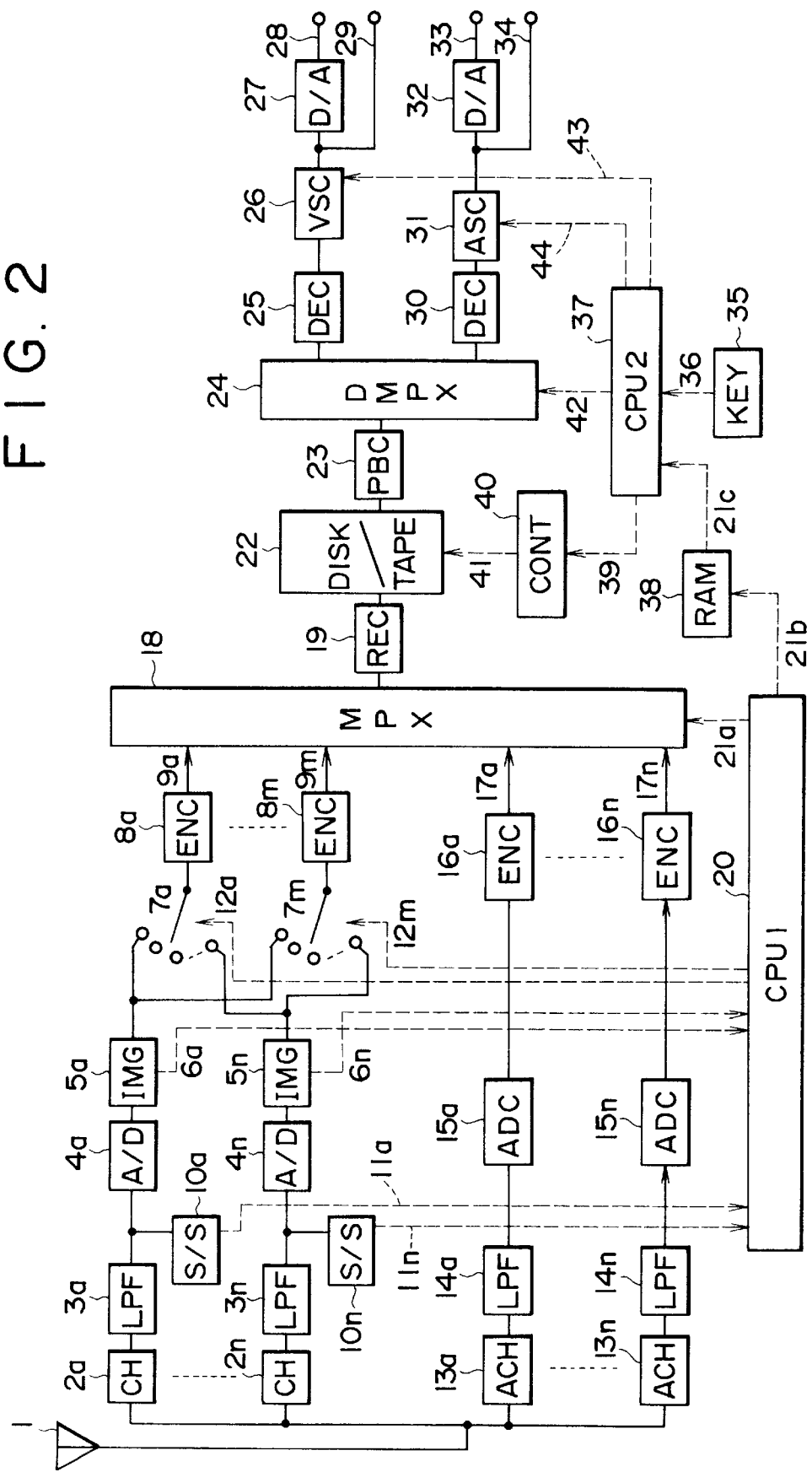
FIG. 2 is a block diagram for illustrating another embodiment of a recording device of the broadcast signal of the present invention.

FIG. 2 shows another embodiment of the present invention.

FIG. 2 shows an example in which main encoders 8a to 8n for the picture signal, which are expensive generally, are omitted from the device which is capable of recording multi-channels utilizing intermittent recording of each CH, in the figure, the same components shown in FIG. 1 are provided with the same numbers respectively and the description is omitted.

In this embodiment, the encoder group (8a to 8m) for the picture signal comprises m encoders ($1 \leq m < n$).

Input switches Sw 7a to 7m to the encoders are structured so that the signal of any one CH out of all CHs is connected.

The first microcomputer 20 controls the switches Sw 7a to 7m based on the synchronization signals 10a to 10n and information 6a to 6n from the representative picture detection circuit.

When the sum of signals recorded as representative picture is approximately less than m/n of inputted signals, this structure is realized. Therefore, m=1 is possible when many pictures are thinned and not many pictures are recorded as representative picture in view of the subject of digest recording and playing back.

It very rarely happens generally that one field (or one frame) of a certain picture is displayed in broadcasting, and it is usual that one scene continues for several seconds to several minutes.

Therefore, when two or more CHs detect scene change simultaneously and recording is required as representative picture, butting between a plurality of CHs is avoided easily by moving by one field (or one frame) to several fields (or frames) for selecting representative picture.

Next, an example in which the movement detection technology is used as a method for detecting the change and for obtaining information to select the representative picture.

First, the principle of the movement detection technology is described.

The movement detection technology is a technology which has been practically used for MPEG already.

Figure 3:
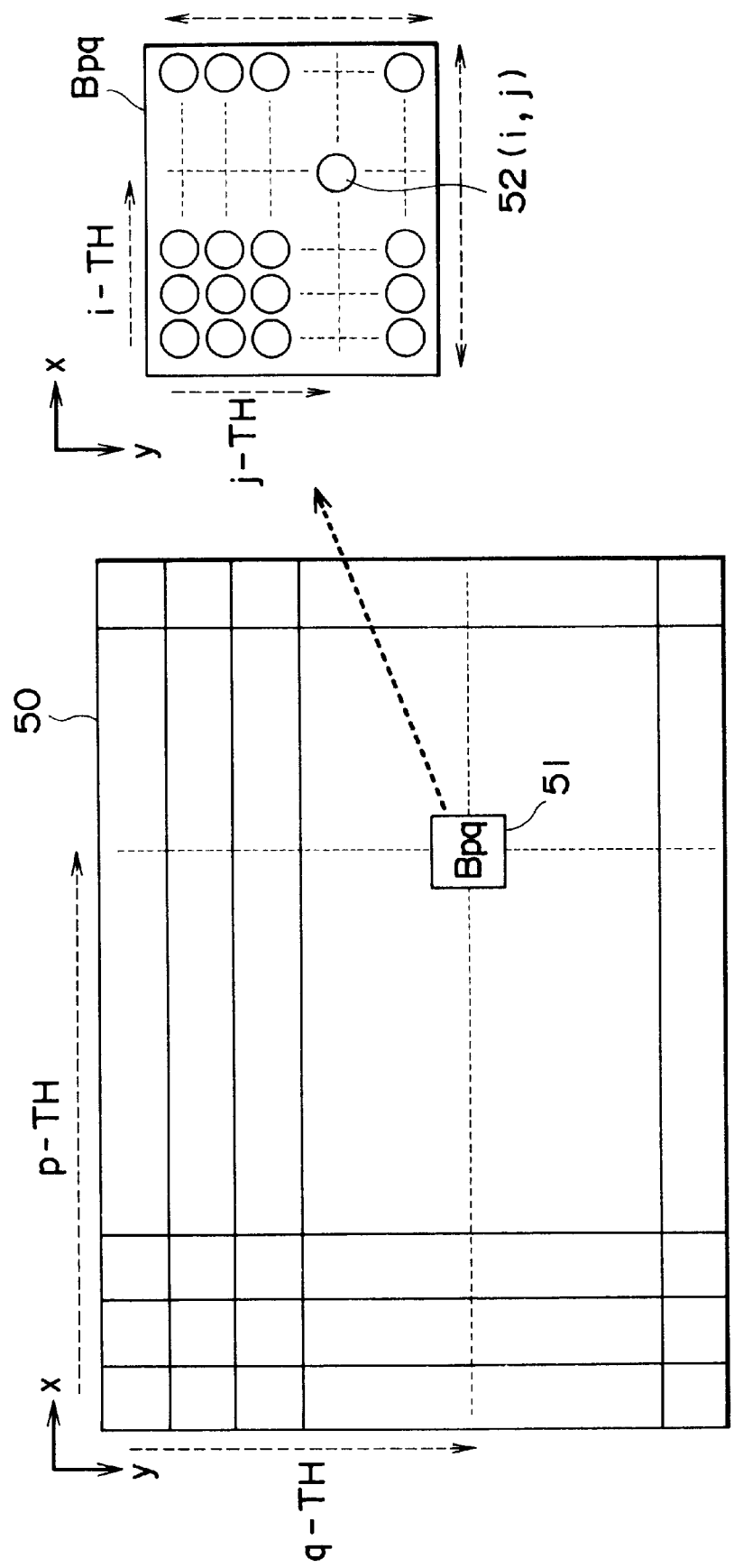
FIG. 3 is a diagram for illustrating the selection of a representative picture.

First, the blocking of a picture is described using FIG. 3. As shown in FIG. 3, a picture 50 is divided into blocks comprising S×S pixels or 2S×S pixels. A block in the picture 50 at the position p-th in x-direction and q-th in y-direction is represented as Bpq 51.

In the enlarged block Bpq, the value of a pixel 52 at the position i-th in x-direction and j-th in y-direction is represented by A (i, j).

Usually, a powered number such as 4 or 8 is selected as the value S. In the description of FIG. 3, S×S block size is shown, but when a block having the different number of pixels in vertical and horizontal directions is used, the same algorithm is applied without loosing the generality, therefore the S×S scheme is described as an example.

In the description hereinafter, for convenience of description, an example is described on the assumption that the picture is equal to the frame. When the picture is equal to the frame, the same algorithm is applied without loosing the generality.

Figure 4:
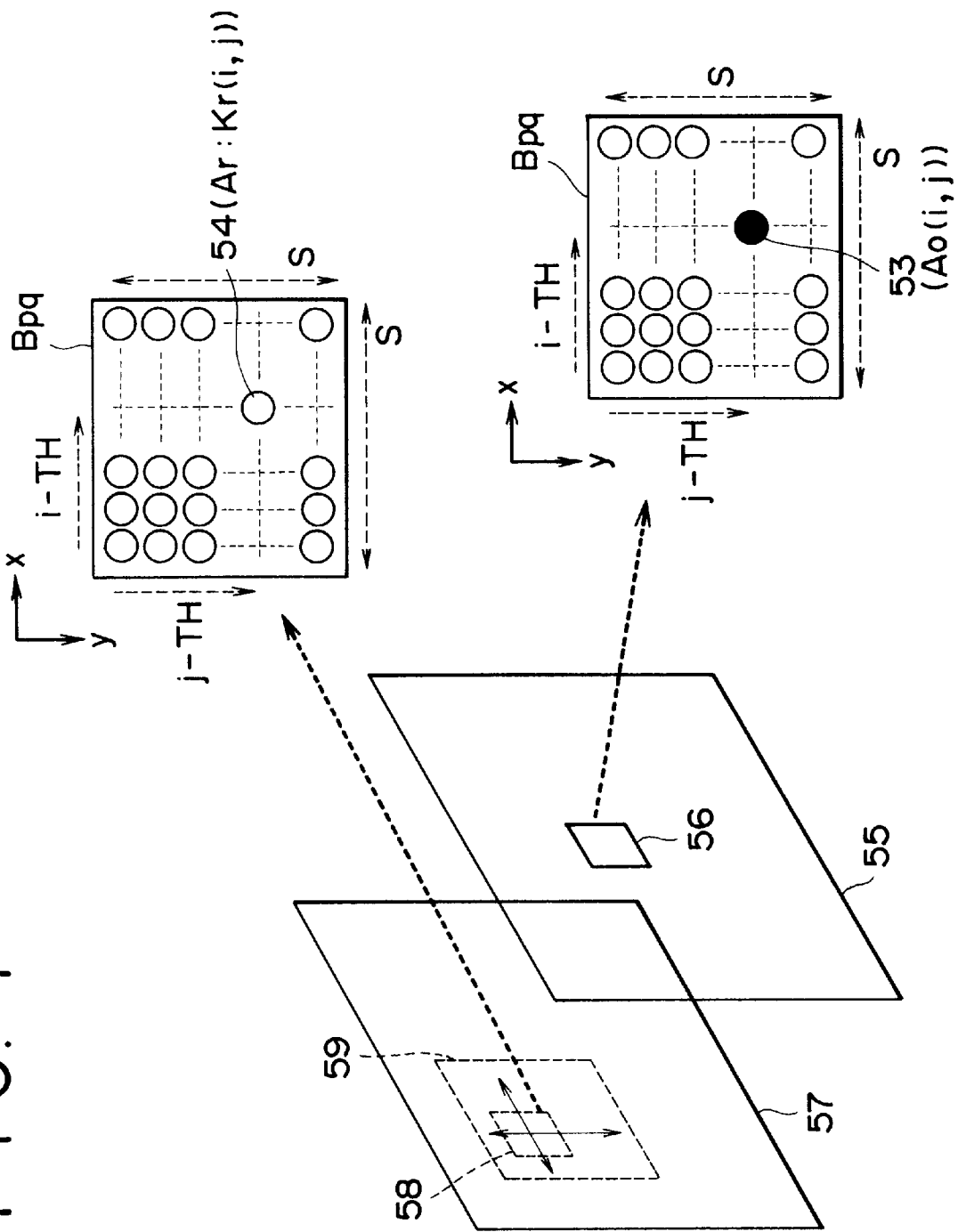
FIG. 4 is a diagram for illustrating the operation for obtaining the movement detection from pixels on the screen.

Next, a method for movement detection is described referring to FIG. 4.

As shown in FIG. 4, the difference between a block BO:pq 56 to be subjected to movement detection in the current frame 55 and an inspection block 58 comprising S×S pixels in the reference frame 57 is calculated.

Usually, the inspection block 58 is prescribed in a certain area, namely search area 59, including the position corresponding to the position of the movement detection block of the current frame on the reference frame 57 as shown in FIG. 4

The inspection block 58 is moved from a pixel to the next pixel in x-direction and y-direction respectively in the search area 59, to detects the difference between the block-j to be subjected to movement detection in the current frame and the inspection block 58 comprising S×S pixels in the reference frame.

It is assumed that the position in the inspection block in the search area 59 displacement k in x-direction and l in y-direction distant from the original point that is the position corresponding to the position in the movement detection block 56 in the current frame is represented as (k, l), the value of the pixel 53 at the position i-th in x-direction and j-th in y-direction in the movement detection block is represented by Ao(i, j), and the value of the pixel 54 at the position i-th in x-direction and j-th in y-direction in the inspection block at the position (k, l) is represented by Ar:kl(i, j), and thus the difference Spq(k, l) between the inspection block at the position (k, l) and the movement block is represented by the equation described herein under.

$$Spq = (k, 1) = \sum_{i=1}^{S} \sum_{j=1}^{S} \{A_0(i, j) - Ar : kl(i, j)\} \qquad (1)$$

This calculation is operated for all (k, l) in the search area 59 prescribed first, and the value (K, L) at the position (k, l) having the minimum value out of the calculated Spq(k, l) is specified as the value of "movement vector" of the movement detection block Bpq between the current frame and reference frame.

The judgment involving the change of picture/movement is derived from the value of movement vector, value of Spq(k, l), and the number of Spq(k, l) is equal to or smaller (or larger) than a certain value of Spq(k, l) in one picture.

For example, when the static picture continues, K=0 and L=0 for all movement blocks in the current frame, and, when, the value of Spq(k, l) is zero. When the scene is panned in the horizontal direction, similarly K=0 (const) and L=0 for all blocks, and, when, the value of Spq(k, l) is zero if the object is static, and the value of Spq(k, l) is very small if the object is moving slowly and if the time interval between the reference frame and current frame is short because of small displacement.

Values Spq(k, l) of only portions where significant change occurs in a short time shows some large values, but the number of such portions is not many.

On the other hand, when the scene is changed, there is no identical picture on two frames, therefore Spq(k, l) is large for all values at (i, j).

The movement detection may be operated on the luminance signal, otherwise, may be operated on the color signal, and may be operated on both luminance/color signals.

The method in which the change is detected using a histogram of the pixel value in a picture may be used as a method for detecting the scene change of picture signal.

As described hereinbefore, the movement of the received picture signal is detected, and when the scene is changed, recording of the picture is required. Otherwise, the change of the scene is ranked, and the device may be programmed so that the representative picture is selected dependently on the rank class.

Further, various parameters may be incorporated in the movement detection to select the representative picture, for example, the time interval between the current frame and reference frame may be made selectable.

Figure 5:
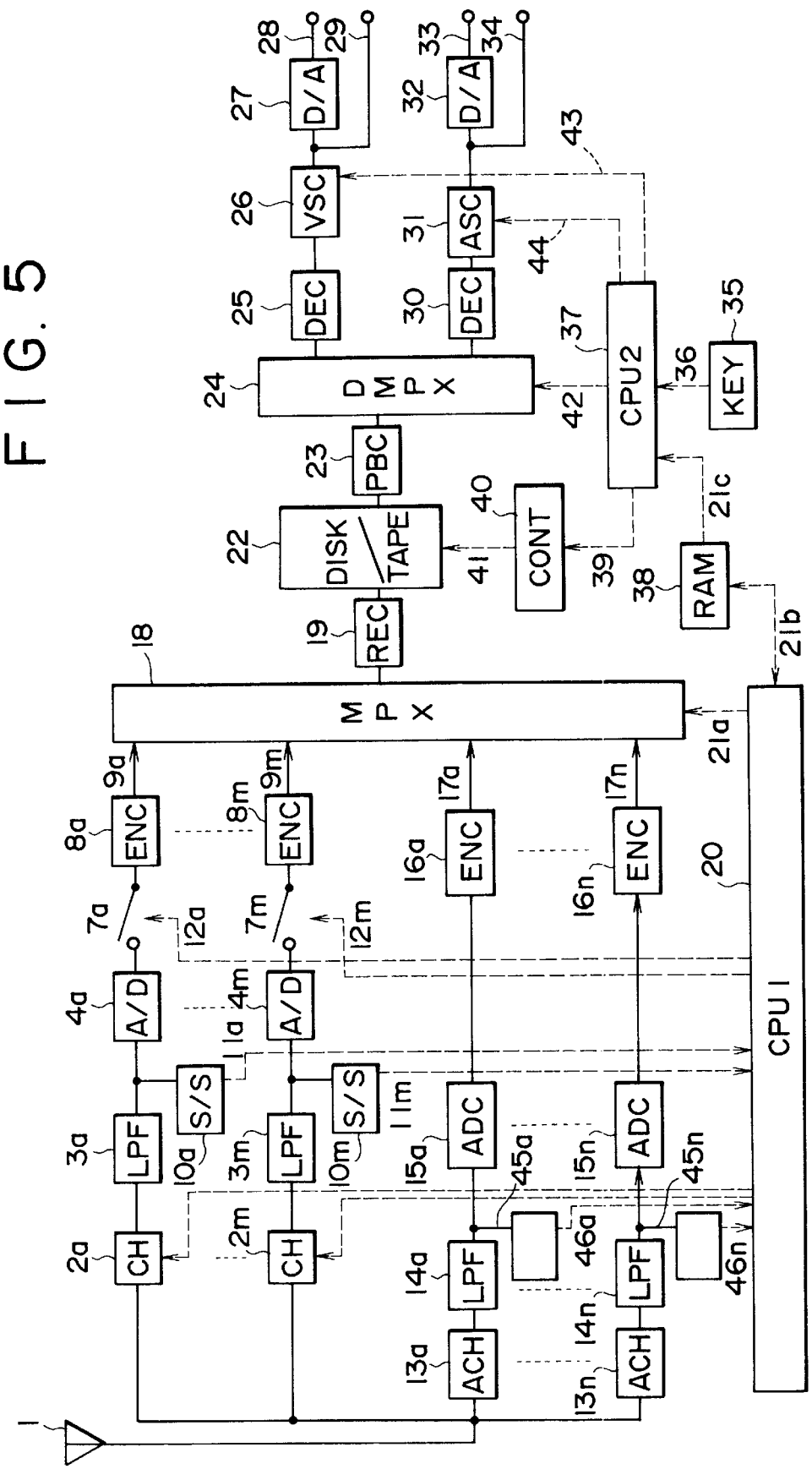
FIG. 5 is a block diagram for illustrating the selection of a representative picture based on the audio signal in the recording device of the present invention.
Figure 6:
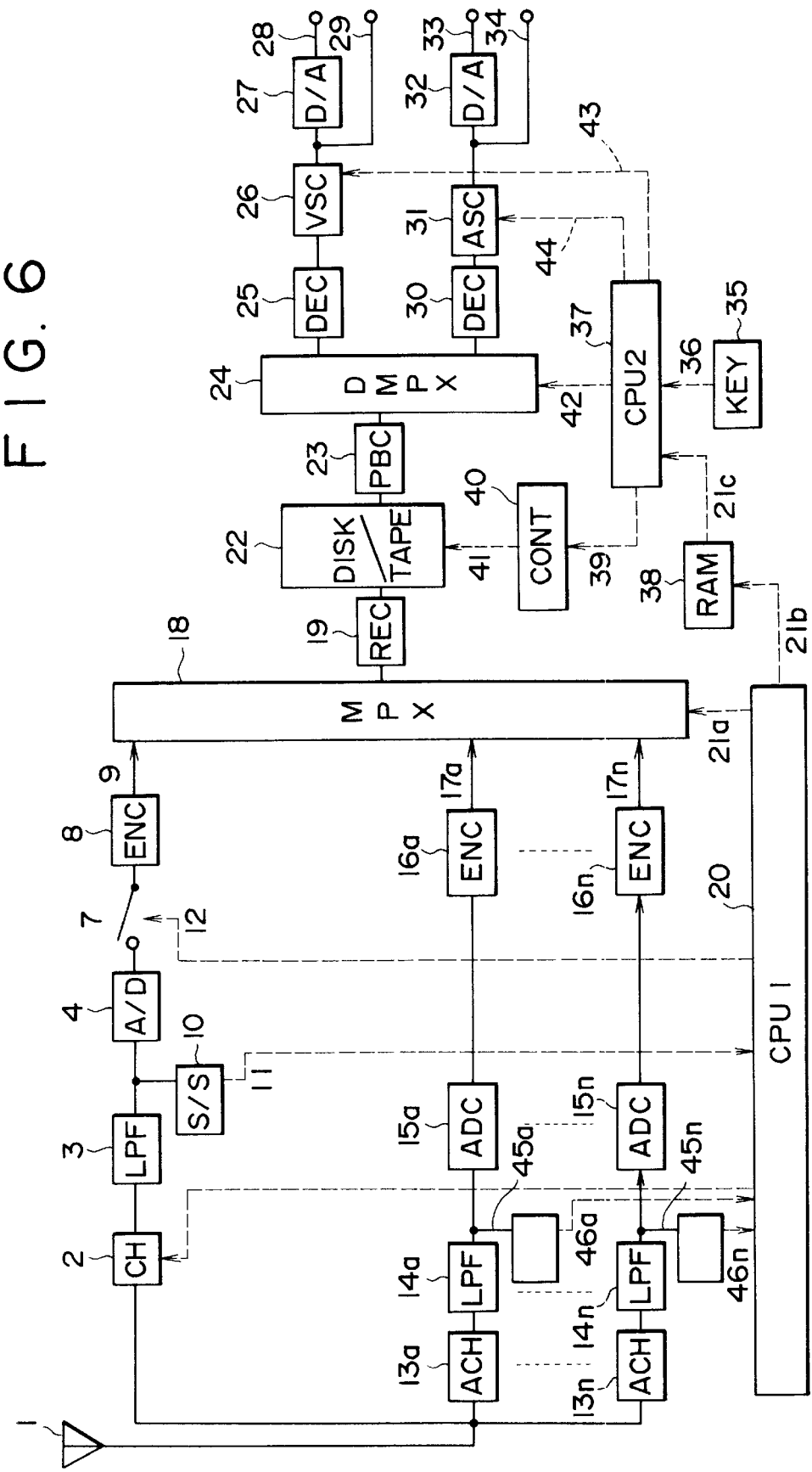
FIG. 6 is a block diagram for illustrating a modified embodiment of the recording device shown in FIG. 3.

Next, the structure of a further embodiment of the present invention is shown in FIG. 5 and FIG. 6.

Though the recorders of the embodiments described hereinbefore are provided with the sufficient function for searching of programs and digest recording and playing back, and require the wide band and expensive picture signal processing circuits so many as the number of CHs, as it is obvious from FIG. 1. The system having the reduced number of circuits as shown in FIG. 2 is presented, but such system requires yet picture tuners 2a to 2n, LPFs 3a to 3n, AD converters 4a to 4n, circuits for detecting change/movement of the pictures 5a to 5n so many as the number of recording, and more reduction of the circuit scale is desirable.

FIG. 5 shows an example having the most general structure in which m series of picture signal circuit systems, which number is less than the number of receiving CHs (n), are switched for using based on the information from the audio signal.

FIG. 6 shows the extreme example having only one circuit for processing the picture signal in which CH is switched for using based on the information from the audio signal.

Figure 8A:
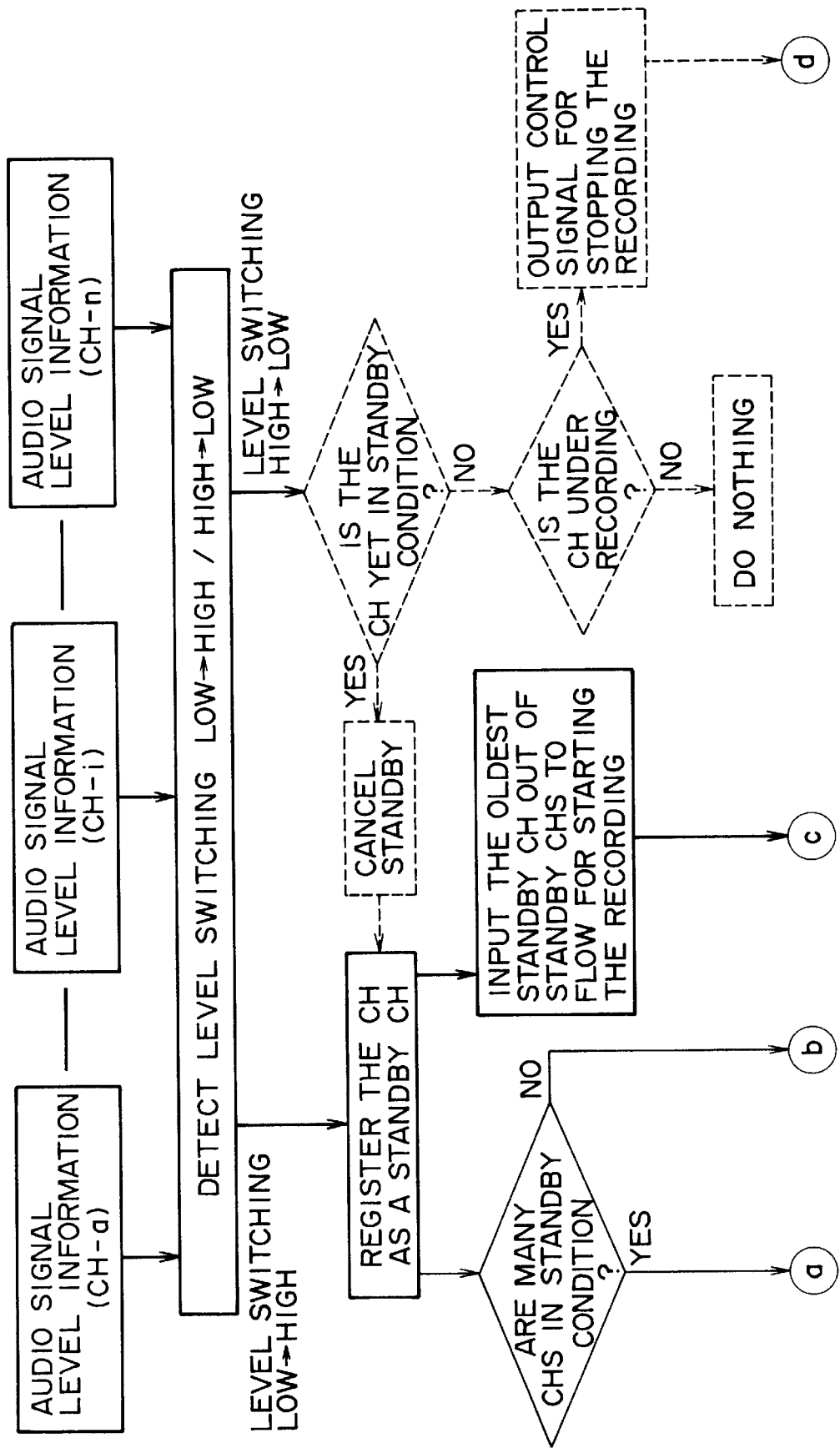
Figure 8B:
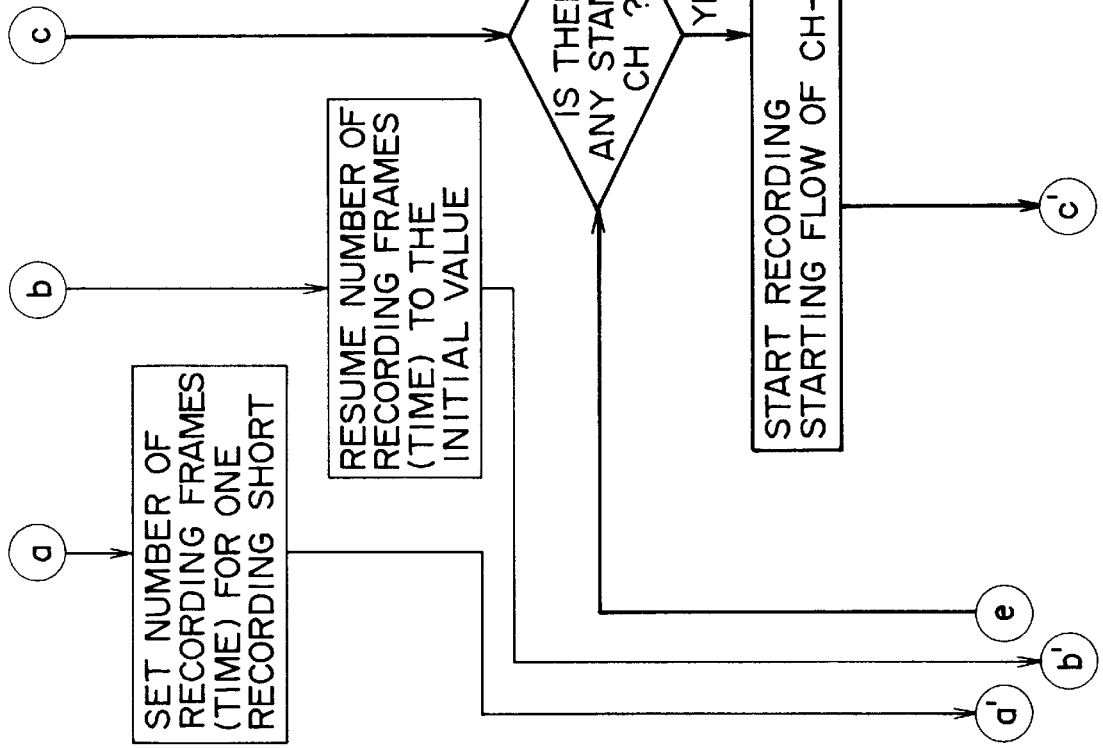

First, the outline of operations of the recording system is described referring to the example shown in FIG. 6, but operations of the playback system is quite the same as those described in the embodiments shown in FIG. 1 and FIG. 2, operations of only the recording system are described herein under, and a method for selecting the representative picture from the audio signal using FIG. 7 is described along with a flow for controlling the recording system using FIG. 8.

In the example shown in FIG. 6, only one recording picture signal processing circuit is provided. A picture signal received by a picture tuner 2 passes through a LPF 3, AD converter 4, switch Sw 7, and encoder 8, and multiplexed with an audio signal and selection information by a multiplexer and recorded.

Differently from the examples shown in FIG. 1 and FIG. 2 in which the change/movement of pictures is detected referring to the picture signal itself, the first microcomputer 20 controls the picture tuner to switch CH.

The switch 7 is turned ON/OFF for starting of recording or for ending of recording of the picture signal synchronously with the frame (or field) synchronization signal (11) detected by a synchronization separation circuit 10 so that the ineffective information for playback such as the record from a halfway frame (or field) or record to a halfway frame (or field) is not recorded.

Tuners 13a to 13n as many as the number of recording CHs are provided. The audio signal passes LPFs 14a to 14n, then the audio signal is digitized by AD converters 15a to 15n, and encoded by encoders 16a to 16n.

On the other hand, the audio signal which had passed the LPFs 14a to 14n is fed to audio signal level detectors 45a to 45n, and audio level information signals 46a to 46n is transmitted to the first microcomputer 20.

In FIG. 5 and FIG. 6. the example in which the audio signal level detection circuits 45a to 45n are provided at the position after the LPFs and before digitizing is shown, but it is possible to provide the audio signal level detection circuits 45a to 45n at the position after digitizing.

Based on the audio level information 46a to 46n, the first microcomputer 20 selects and decides the picture recording CH to be recorded next. Based on the selected decision, the picture signal tuner 2 is switched as described herein above.

As described hereinbefore, by selecting and recording the picture signal based on the audio signal, the number of recording system circuits for the picture signal can be reduced.

FIG. 5 shows the system in which the picture signal is switched based on the information from the audio signal, and this is an example of the structure in which a plurality of picture signal processing systems are provided though the number of the picture signal processing systems is smaller than the number of receiving CHs.

By using a plurality of picture tuners 2a to 2n, the time required for stabilization of operations after switching of a tuner is effectively shortened. Further, this system is advantageous in that the receivable CH range can be wide by providing VHF/UHF tuners and satellite broadcast tuners in parallel, because the switching between VHF/UHF and satellite broadcast is impossible using only a single circuit.

Next, FIG. 7 shows an example in which a level detection circuit for the audio signal is used as the simplest example for switching of picture signal CH based on the audio signal.

As shown in the block diagram of FIG. 7, an inputted audio signal 51 is detected by an amplitude detection circuit 52, passes through a LPF 53, and outputted as the detected output 54. On the other hand, a reference level 56 is set by a threshold-level setting circuit 55 which is provided for generating the prescribed reference level, the level of the detected output is compared with the reference voltage by a comparator 57, and the level information 58 for indicating whether the detected output is higher or lower than the reference voltage is outputted.

The lower half of FIG. 7 shows such processes described herein above. For example, the detected output 54 and reference level 56 are positioned as described in the lower half figure, the level information 58 as shown at the bottom of the figure is obtained.

In the case of the broadcast signal, the picture signal is changed definitely just between two scenes/cuts with the frame unit in some cases, but as for the audio signal, usually the signal is switched with muting because such definite switching causes switching noise. The audio signal continues usually for a time longer than several seconds (a period of audio signals shorter than one seconds can not be heard).

The picture signal is the signal composed of 30 frames per second (60 fields), therefore a time period of several seconds corresponds to the picture signal composed of from 50 to several hundreds of frames.

In view of the numerical correspondence and the time correspondence between the audio signal and picture signal, it is reasonable to use the level at the time point, when the level information of the audio signal filtered by the LPF to eliminate noise is switched from Low to High, as the reference for switching the representative picture of the picture signal. Y4

On the other hand, in the case of programs such as talk programs and wide show programs in which a plurality of speakers talk each other alternately, switching of the picture and speech (speaker) is categorized into two types, one is the case that first the picture signal is switched and then another speaker starts to speak, and another one is the case that first the speaker is switched and then the picture is switched.

In the latter case, for selecting the representative picture so that the picture corresponds just to the speech, it is effective to select a whole time period or a partial time period after a some interval (from several frames to several seconds) from the time point when the audio signal level is switched from Low to High as the representative picture as shown on the waveform of the level information with "A" in FIG. 7.

Finally, the control flow for switching the picture circuit after the representative picture detection is described using FIG. 8.

In FIG. 8, the flow shown with the thick solid line represents the basic flow, the chain double-dashed line with half-tone dot meshing represents the flow of forced ending of recording based on OFF of the audio level, the chain single-dashed line with dark-tone dot meshing represents the flow of "recording during free time" while there is no recording request, and the thin solid line represents the flow for switching the frames for one recording (recording time) dependently on the number of recording requesting CHs.

Flows other than the first basic flow are not indispensable for structuring the system, but they are usefully functional.

Next, the basic flow is described.

When the audio signal level information (46a to 46n in FIGS. 5 and 6) is transmitted from the audio signal level detection circuits (45a to 45n in FIG. 5 or FIG. 6) of each CH to the first microcomputer 20, the microcomputer 20 detects the switching from Low to High.

As described herein above in FIG. 7, this detection means the detection of the starting point of the audio signal. Upon detection of the starting information of the audio signal, the CH is registered as a standby CH assuming that the picture signal recording request is generated from the CH.

On the other hand, as for the recording starting flow, the microcomputer checks the existence of the standby registration, and if the microcomputer finds a registration, then proceeds with the recording starting flow of the CH which was registered first. (herein the first CH is designated as ch-i). If there is no standby CH, the mode proceeds to "free time recording" mode.

First, whether the picture signal is under recording now is judged. If it is the timing when the preceding recording just ends, the recording starting control of ch-i is executed immediately. In detail, the picture tuner is switched to ch-i, the frame (or field) synchronization signal is detected, and the control signal 12 is transmitted to the switch Sw 7 to turn it ON so that recording is started synchronously with the synchronization signal to start recording.

On the other hand, if the picture signal is under recording at that time, (the CH under recording is designated as ch-k) after the ending of that recording, the recording starting control for Ch-i is executed.

In detail, when recording of prescribed frames (time) ends, first the recording ending control for Ch-k is executed. The switch Sw 7 control signal 12 is outputted synchronously with the frame (or field) synchronization signal 11 detected by the synchronization signal detection signal 10, and the switch Sw 7 is turned OFF temporarily. Then, the recording starting control described herein above is executed. After the starting of the recording, prescribed frames (or time) are recorded, and then the process returns to the judgment of existence of a standby CH.

In general, in the case of broadcast signal, because the timing of the frame synchronization signal is not identical between CHs, not to record ineffective information which is a fractional frame (field) less than one frame (field) and can not be presented when playing back, it is required that the recording of the CH under recording is ended at the timing synchronously with the synchronization signal of the CH, the synchronization signal of the CH to be recorded newly is detected, and the recording is started synchronously with this synchronization signal.

However as the exception, in the case that broadcast from only specified broadcasting stations is received and the coincidence of synchronization signal timing of all receiving CHs is confirmed, the switching of only the tuner is sufficient, the ON/OFF control of the switch Sw 7 is not necessary.

Next, the forced ending feature shown with the chain double-dashed line is described. As described in FIG. 7, when the level of audio signal is detected, the detection output is subjected to LPF 53 to render resistance to noise, but the time constant can not be long unlimitedly in order to detect correctly a pause between speeches.

On the other hand, though it happens not frequently in broadcasting, a short meaningless shout such as "Att!" is rarely inputted, ON/OFF of such audio can be detected, the ON information results in a standby registration, if many such standby registrations continue successively, it may happen that the picture signal at the time when the audio signal had already ended is recorded during the recording with switching of CHs successively.

When there is no standby CH for recording when such ON signal is generated and the CH is recorded, it could happen rarely, when a certain time is prescribed as the representative picture, that the recording continues because the prescribed time is not over in spite of the ended recording of the audio signal of this CH, and that next another standby recording can not be started.

The forced ending flow is a fail safe flow to prevent such undesirable recording.

The ending of the audio signal is detected and whether the CH is under standby registration is checked.

If the CH is under standby registration, the audio signal is judged to be a meaningless audio signal, and the standby registration is cancelled.

If there is following standby registration of this CH already, the priority of the CH is moved up. If there is no standby registration already, the recording of the CH is under recording or had ended, and whether the CH is under recording is checked. If the CH is not under recording, the recording of certain frames (or time) had ended, therefore there is nothing to do.

If the CH is under recording, the recording is ended forcedly synchronously with the next frame (field) synchronization signal to prepare for the next recording, and the process returns to the operation to check whether there is a standby CH.

Though such recording skip mechanism is provided, because the content of broadcast of each CH is independent each other, it is probable that the standby generation frequency based on level change detected from the audio signal of each CH fluctuates to some extent. The control mechanism for more effective recording to control the fluctuation of generation frequency of the standby signal is the function shown in the figure with thin solid lines.

Some longer frames (time) are prescribed as default, when there are many standbys, one recording time for one CH is controlled to shorten depending on the number of standbys.

When the number of registrations of standby signal decreases to a certain number, the recording time is resumed to the original default value. By controlling as described herein above, the number of CHs of the picture signal circuit is suppressed while lack of recording due to skip operation is minimized.

Further, it is possible to control more sophisticatedly. A table which lists the number of recording frames classified to many levels dependent on the number of standby CHs is prepared previously, and by referring to this table, the recording frames (time) is decided dependently on the number of standby CHs.

For example, the sophisticated control as described herein under is possible. 60 frames (2 seconds) are recorded for the standby CH of 1, 30 frames (1 second) are recorded for the standby CH of 2, 20 frames are recorded for the standby CH of 3, 15 frames are recorded for the standby CH of 4, 12 frames are recorded for the standby CH of 5, and 10 frames are recorded for the standby CH of 6.

When all CHs continue silence or all CHs continue the audio signal without pause, no switching of the audio level from Low to High occurs. The recording with a suitable interval of the CH which generates the audio signal in such conditions described above is effective for grasping the content of the playback information. (the recording in such condition is referred to as "free time recording")

When, the process proceeds to "free time recording" mode represented by the dashed line with dark-tone dot meshing in FIG. 8.

First, the recording CH for free time recording is decided, two methods for decision are described herein under.

The first method is a decision method based on the recording interval.

First, the CH with the audio signal (the CH with level signal of High) is selected. When there is no audio signal for all CHs, no recording is operated. The CH having the longest no-recording time period out of CHs with the audio signal is assigned as the recording CH.

This method of selection is advantageous in that pictures are displayed with a suitable interval, and long time displaying of a picture with no change does not occur, it is suitable for recording of drams and movies.

The second method is a decision method based on the history of recording.

The history of recording time within several minutes to several hours in the past for each CH is stored in the memory 38 in FIG. 5 and FIG. 6. Referring to the number of CH selections within latest several seconds to several minutes in the history, the CH having the maximum number of selections is recorded preferentially, because the maximum number of selections means the program with many picture changes per unit time.

After the CH is selected and decided as described herein above (the CH decided is referred to as ch-j), the recording starting control of ch-j is executed. The recording starting control of ch-j is executed in the same manner as that of ch-i though the operation involves different CH. (because there is no recording CH currently and the mode is in this mode, the recording starting control is executed directly without checking of recording CH and ending control)

It is one optional processing that the free time recording does not have priority over the standby recording because the free time recording is the recording not based on the standby information. In other words, when a standby signal is generated during a free time recording, the free time recording is brought to a stop immediately to record the standby preferentially, the recording is switched to the recording of the standby CH. Such control may be introduced.

As described hereinbefore, in the device for recording (playback) of broadcast of the present invention, the representative picture is detected, and by thinning the picture remaining the representative picture, the quantity of recording information is reduced without loosing necessary pictures for grasping the content when playing back, and the required capacity of the storage medium for a certain time period can be reduced.

When the capacity of the storage medium is fixed, the longer recording is possible.

The required number of tuners and encoders is provided, the signal band for recording on the recording medium can be reduced because of thinned recording, and multi-recording is realized.

Further, by using a control method which utilizes actively the intermittent feature of the intermittent recording, the number of expensive encoders for the picture can be reduced while the advantage of simultaneous recording of multi-CHs is maintained.

Expensive recording circuits with wide band such as ECC are not necessary because of band reduction effect though it is for multi-recording, and the low cost is realized because of a single system structure.

The transport rate and band for recording and playing back required for the recording medium are also reduced in proportion to the reduction effect, and the low cost is therefore realized without requirement for the special recording device.

As for taking up of intermittent pictures, the taking up of one picture unit and the taking up in unit of dynamic picture of some length are both acceptable, the grasping of the content when playing back is very easy.

Further, by controlling the taking up proportion so that the taking up proportion is prescribed high for the scene with many change/movement and the taking up proportion is prescribed low for the scene with less change/movement, the grasping of the content when playing back is becomes easier. In the playback of scene recorded intermittently including the representative picture, the quick reference playback which is for easy grasping of the content is easy to operate.

In particular, when a device provided with a disk medium excellent in "accessibility" as the recording medium is used, the "program search" in which first a desired program is selected by "trial view" in "quick reference" for rough grasping of the program content and then the selected program is viewed in normal speed is easily operated.

In particular, in the system of the present invention that the representative picture of the picture signal is selected based on the audio signal information, the picture signal circuit can be used with switching from the picture tuner, the number of picture signal processing circuits for CHs, which require wide band and much power consumption and is expensive, can be reduced, this reduction is effective on cost saving of the device.

What is claimed is:

1. A broadcast signal recording device for performing digest recording of a broadcast signal including a multiple of channels, comprising:

a receiving means for receiving the broadcast signal, at least one representative picture sampling means for sampling a representative picture from the picture signal of said received broadcast signal at a time temporally succeeding an audio signal, at least one information sampling means for detecting information corresponding to said picture signal, and a recording means for recording the picture signal obtained from said representative picture sampling means and information detected by said information sampling means, said recording means including a control means for controlling the recording time based on said multiple of channels and being operable to stop recording the picture signal when the audio signal is interrupted during sampling of the representative picture.

2. A method for performing digest recording of a broadcast signal including a multiple of channels, comprising the steps of:

receiving the broadcast signal, sampling an audio signal from said received broadcast signal, sampling by at least one representative picture sampling means a representative picture from the picture signal of the received broadcast signal at a time temporally succeeding said sampled audio signal, detecting by at least one information sampling means information corresponding to said representative picture, and recording said sampled picture signal, audio signal, and detected information, controlling the recording time per channel based on the number of said channels, and stopping the recording of the picture signal when the audio signal is interrupted during sampling of the representative picture.

3. A broadcast signal recording device for performing digest recording of a broadcast signal including a multiple of channels, comprising;

a receiving means for receiving the broadcast signal, at least one representative picture sampling means for sampling a representative picture from the picture signal of said received broadcast signal, at least one information sampling means for detecting information corresponding to said picture signal, and a recording means for recording the picture signal obtained from said representative picture sampling means and said information detected by said information sampling means, said recording means including a control means for controlling the recording time dependently on the number of said channels;

wherein said representative picture sampling means samples the representative picture based on an audio signal, at a time temporally succeeding said audio signal, wherein said recording means stops recording the picture signal when the audio is interrupted during sampling of the representative picture, and wherein the number of said information sampling means is less than the number of said channels.

4. A method for performing digest recording of a broadcast signal including a multiple of channels, comprising the steps of;

receiving the broadcast signal, sampling a multiple of audio signals from said multiple of channels, sampling a representative picture from the picture signal of the received broadcast signal by at least one representative picture sampling means based on said sampled audio signal from said received broadcast signal, said sampling of said representative picture being performed at a time temporally succeeding said audio signal, detecting by at least one information sampling means information corresponding to said representative picture, and recording said sampled picture signal, audio signal, and said detected information, controlling the recording time per channel according to the number of said channels, and stopping the recording of the picture signal when the audio is interrupted during sampling of the representative picture;

wherein the number of said information sampling means is less than the number of said channels.

* * * * *